(12) United States Patent
Schmid et al.

(10) Patent No.: US 7,791,394 B2
(45) Date of Patent: Sep. 7, 2010

(54) DECENTRALISED FAULT-TOLERANT CLOCK PULSE GENERATION IN VLSI CHIPS

(75) Inventors: Ulrich Schmid, Vienna (AT); Andreas Steininger, Vienna (AT)

(73) Assignee: Technische Universitat Wien, Vienna (AT)

( * ) Notice: Subject to any disclaimer, the term of this patent is extended or adjusted under 35 U.S.C. 154(b) by 382 days.

(21) Appl. No.: 11/630,268

(22) PCT Filed: Jul. 18, 2005

(86) PCT No.: PCT/AT2005/000280

§ 371 (c)(1),
(2), (4) Date: Jun. 20, 2008

(87) PCT Pub. No.: WO2006/007619

PCT Pub. Date: Jan. 26, 2006

(65) Prior Publication Data

US 2009/0102534 A1    Apr. 23, 2009

(30) Foreign Application Priority Data

Jul. 19, 2004    (AT)    .............................. A 1223/2004

(51) Int. Cl.
G06F 1/04    (2006.01)
(52) U.S. Cl. ........................ 327/295; 327/292
(58) Field of Classification Search ......... 327/291–293, 327/295, 141, 297
See application file for complete search history.

(56) References Cited

U.S. PATENT DOCUMENTS 6,057,724 A * 5/2000 Wann ......................... 327/292

(Continued)

FOREIGN PATENT DOCUMENTS

EP    0 223 031 A2    5/1987

(Continued)

OTHER PUBLICATIONS

"Arteris unveils strategy, technology for enabling Network-On-Chip (NoC) design", Design & Reuse, Mar. 1, 2004 [1 page].

(Continued)

*Primary Examiner*—Hai L Nguyen
(74) *Attorney, Agent, or Firm*—Davidson Berquist Jackson & Gowdey LLP (57) ABSTRACT

The invention relates to a method for distributed, fault-tolerant clock pulse generation in hardware systems, wherein the system clock pulse is generated in distribution by a plurality of intercommunicating fault-tolerant clock pulse synchronization algorithms (TS-Algs), in which an arbitrary number of such TS-Algs exchange information between one another via a user-defined and permanent network (TS-Net) of clock pulse signals, susceptible to transient faults, and each TS-Alg is assigned to one or more functional units (Fu1, Fu2, ... ), whose local clock pulses are generated by it, and further all local clock pulses are synchronized with respect to frequency in an assured manner, and a specified number of transient and/or permanent faults may occur in the TS-Algs or in the TS-Net, without adversely affecting the clock pulse generation and/or the synchronization accuracy, and the system clock pulse automatically achieves the maximum possible frequency. The invention further relates to such a hardware system.

10 Claims, 4 Drawing Sheets

Communication via 1-bit signal

U.S. PATENT DOCUMENTS

| | | | |
|---|---|---|---|
| 6,204,713 B1 * | 3/2001 | Adams et al. | 327/295 |
| 6,433,598 B1 * | 8/2002 | Schultz | 327/161 |
| 6,897,699 B1 * | 5/2005 | Nguyen et al. | 327/295 |
| 7,023,252 B2 * | 4/2006 | Schultz | 327/161 |
| 7,042,269 B2 * | 5/2006 | Kao | 327/295 |
| 7,126,405 B2 | 10/2006 | Fairbanks | |
| 2003/0034819 A1 | 2/2003 | Kamiya | |
| 2004/0108876 A1 | 6/2004 | Fairbanks | |
| 2004/0158759 A1 | 8/2004 | Chang et al. | |

FOREIGN PATENT DOCUMENTS

| | | |
|---|---|---|
| TW | 509835 | 11/2002 |

OTHER PUBLICATIONS

"Overall Roadmap Technology Characteristics", The International Technology Roadmap for Semiconductors, 2002 Update [pp. 150-173].

Bhamidipati, Ram et al., "Challenges and Methodologies for Implementing High-Performance Network Processors", Intel Technology Journal, vol. 6, Issue 3, Aug. 15, 2002 [12 pages].

Chapiro, Daniel M., "Globally-Asynchronous Locally-Synchronous Systems", A Dissertation Submitted to the Department of Computer Science, Oct. 1984 [18 pages].

Chen, Charlie Chung-Ping et al., "Future SOC Design Challenges and Solutions", Proceedings of the International Symposium on Quality Electronic Design (ISQED'02), Apr. 2002 [4 pages].

Choi, Bong-Rak et al., "An Improved Hardware Implementation of the Fault-Tolerant Clock Synchronization Algorithm for Large Multiprocessor Systems", IEEE Transactions on Computers, vol. 39, No. 3, Mar. 1990, [pp. 404-407].

Constantinescu, Cristian, "Impact of Deep Submicron Technology on Dependebility of VLSI Circuits", Proceedings of the International Conference on Dependable Systems and Networks (DSN'02), May 2002 [5pages].

Dolev, Danny et al., "On the Possibility and Impossibility of Achieving Clock Synchronization", Journal of Computer and System Sciences, vol. 32, No. 2, Apr. 1986 [pp. 230-250].

Dopperpuhl, Daniel W. et al., "A 200-MHz 64-b Dual-Issue CMOS Microprocessor", IEEE Journal of Solid-State Circuits, vol. 27, No. 11, Nov. 1992 [pp. 1555-1567].

Friedman, Eby G., "Clock Distribution Networks in Synchronous Digital Integrated Circuits", Proceedings of the IEEE, vol. 89, No. 5, May 2001 [pp. 665-692].

Fura, David et al., "Design and Validation of a Fault-Tolerant Distributed Clock", IEEE Journal, 1988 [pp. 495-502].

Hauck, Scott, "Asynchronous Design Methodologies: An Overview", Proceedings of the IEEE, vol. 83, No. 1, Jan. 1995 [37 pages].

Horauer, Martin et al., "PSynUTC—Evaluation of a High Precision Time Synchronization Prototype System for Ethernet LANs", Proc. 34th IEEE PTTI '02, Jan. 9, 2003 [14 pages].

Huffman, D. A., "The Synthesis of Sequential Switching Circuits", Journal of the Franklin Institute, vol. 257, Nos. 3 and 4, Mar and Apr. 1954 [61 pages].

Kopetz, Hermann, "Real-Time Systems: Design Principles for Distributed Embedded Applications", The Kluwer International Series in Engineering and Computer Science, Kluwer Academic Publshers, 1997 [12 pages].

Lamport, Leslie et al., "Synchronizing Clocks in the Presence of Faults", Journal of the Association for Computing Machinery, vol. 32, No. 1, Jan. 1985 [pp. 52-78].

Lu, Meiliu et al., "A Design Approach for Self-Diagnosis of Fault-Tolerant Clock Synchronization", IEEE Transactions on Computers, vol. 38, No. 9, Sep. 1989 [pp. 1337-1341].

Lundelius, Jennifer et al., "A New Fault-Tolerant Algorithm for Clock Synchronization", Laboratory for Computer Science, Massachusetts Institute of Technology, June 1984 [pps. 75-88].

Lundelius, Jennifer et al., "An Upper and Lower Bound for Clock Synchronization", Academic Press, Information and Control, vol. 62, 1984 [pp. 190-204].

Maza, M. Salim et al., "Analysis of Clock Distribution Networks in the Presence of Crosstalk and Groundbounce", IEEE, 2002 [pp. 773-776].

Myers, Chris J., "Asynchronous Circuit Design", John Wiley and Sons, Inc., 2001 [pp. viii-xvii].

Ofek, Yoram, "Generating a Fault-Tolerant Global Clock in a High Speed Distributed System", IEEE Journal, 1989 [pp. 218-226].

Olson, Alan et al., "Fault-Tolerant Clock Synchronization for Distributed Systems Using Continuous Synchronization Messages", publication source unknown, Jun. 27, 1995 [pp. 154-163].

Ramanathan, Parameswaran et al., "Fault-Tolerant Clock Synchronization in Distributed Systems", IEEE, Oct. 1990 [pp. 33-42].

Restle, Philip J. et al., "A Clock Distribution Network for Microprocessors", IEEE Journal of Solid-State Circuits, vol. 36, No. 5, May 2001 [pp. 792-799].

Restle, Philip J. et al., "The Clock Distribution of the Power4 Microprocessor", IEEE International Solid-State Circuits Conference, Session 8, High Speed Timing 8.4, 2002 [2 pages].

Schmid, Ulrich et al., "Distributed Computing in the Presence of Bounded Asynchrony", Dissertation, Institut fur Technische Informatik, May 2004 [117 pages].

Schneider, Fred B., "Understanding Protocols for Byzantine Clock Synchronization", Department of Computer Science, Cornell University, Aug. 24, 1987 [38 pages].

Shin, Kang G. et al., "Transmission Delays in Hardware Clock Synchronization", IEEE Transactions on Computers, vol. 37, No. 11, Nov. 1988 [pp. 1465-1467].

Srikanth, T. K. et al., "Optimal Clock Synchronization", Journal of the Association for Computing Machinery, vol. 34, No. 3, Jul. 1987 [pp. 626-645].

Steininger, A., "Identifying Efficient Combinations of Error Detection Mechanisms Based on Results of Fault Injection Experiments", IEEE Transactions on Computers, vol. 51, No. 2, Feb. 2002 [pp. 235-239].

Suri, Neeraj, "Synchronization Issues in Real-Time Systems", Proceedings of the IEEE, Vol. 82, No. 1, January 1994 [pps. 41-53].

Sutherland, Ivan E., "Micropipelines", Communication of the ACM, vol. 32, No. 6, Jun. 1989 [pp. 720-738].

Truong T. Kien, "Single Chip Fault Tolerant Clock for Integrated Modular Avionics", IEEE, 1997 [9 pages].

Van Berke, C. K. (KEES), "Scanning the Technology", Proceedings of the IEEE, vol. 87, No. 2, 1999 [19 pages].

Vasanthavada, Nagesh et al., "Synchronization of Fault-Tolerant Clocks in the Presence of Malicious Failures", IEEE Transactions on Computers, vol. 37, No. 4, Apr. 1988 [pp. 440-448].

Wensley, John H. et al., "SIFT: Design and Analysis of a Fault-Tolerant Computer for Aircraft Control", Proceedings of the IEEE, vol. 66, No. 10, Oct. 1978 [pp. 1240-1255].

Widder, Josef et al., "Booting Clock Synchronization in Partially Synchronous Systems with Hybrid Process and Link Failures", Technical Report 183/1-126, Dept. of Automation, TU Vienna, Jan. 2003, [23 pages].

Widder, Josef, "Booting Clock Synchronization in Partially Synchronous Systems", Proc. 17th International Conference on Distributed Computing (DISC 2003) Sorrento, Italy, Nov. 13, 2003 [pp. 1-15].

* cited by examiner

Prior Art

Fig. 4

Distributed clock pulse
generation

Prior Art

Fig. 5

DECENTRALISED FAULT-TOLERANT CLOCK PULSE GENERATION IN VLSI CHIPS

The future development of digital VLSI chips is characterized by constantly increasing integration density, complexity and clock frequency. This, however, increases the difficulty of providing, in all of the functional units (Fu), the synchronous clock pulses demanded by the synchronous design paradigm:

Signals require a complete clock pulse cycle (and more) in order to address all functional units on the chip.

There are demands for increasingly expensive procedures for skew optimization of the clock tree.

Clock trees and buffers consume a large amount of power and surface area and are the cause of significant power supply problems and interference radiation.

The maximum clock pulse frequency can only be determined on a place-&-route basis (and must be selected conservatively).

Added to this is the fact that the clock pulse signal is a classical single point of failure:

External quartz crystals are expensive, big and mechanically sensitive.

Every (even transient) error in the clock tree leads to a system failure.

In the meantime, the fact that the track delays dominate the switching times in VLSI chips, an alternative method drawn from the field of fault-tolerant distributed systems can be envisaged for the generation of clock pulses: Clock synchronization. In this case, the underlying concept is to assign a separate local clock pulse-generating unit (TS-Alg) to all (or a sufficient number of) functional units to provide a local clock pulse (microtick) to each functional unit. All TS-Algs are fully interconnected and use this TS-Net for synchronizing their local microticks to each other.

The synchronization accuracy $\pi=\pi(\Theta)$ of the method used depends merely on the ratio $\Theta$ of the slowest and fastest paths in the TS-Net (virtually delay-insensitive). Macroticks that match the desired global synchronous clock pulse can be obtained from the microticks by switching in a (programmable) divider $\div\pi$. The benefits of the method are:

The chip generates its own clock pulses and thus does not require an external oscillator. Unlike simple ring oscillators, the entire chip is involved in the clock pulse generation, which a priori improves the frequency stability. In addition, temperature compensation can be implemented.

The chip works automatically with the highest possible frequency, which is dependent on the delays caused by the place-&-route of the TS-Net and the operational conditions. In fact, the slowest paths can be masked out with suitable parametering of the TS-Alg.

The paradigm of synchronization can be applied not only to the design of the local functional units (based on microticks) but can also be retained with the global communication (via microticks) between the functional units.

The method tolerates a configurable number of transient and permanent errors in the TS-Net that can be demonstrated as being correct.

The number of the TS-Algs can be selected optimally depending on the requirements, whereby the overheads (surface area, . . . ) of the clock pulse generation can be monitored.

The procedure also offers an elegant solution to the problem of synchronous reset, which is difficult to resolve in the case of very large chips with high clock pulse rates.

BACKGROUND OF THE INVENTION

Figure 4:
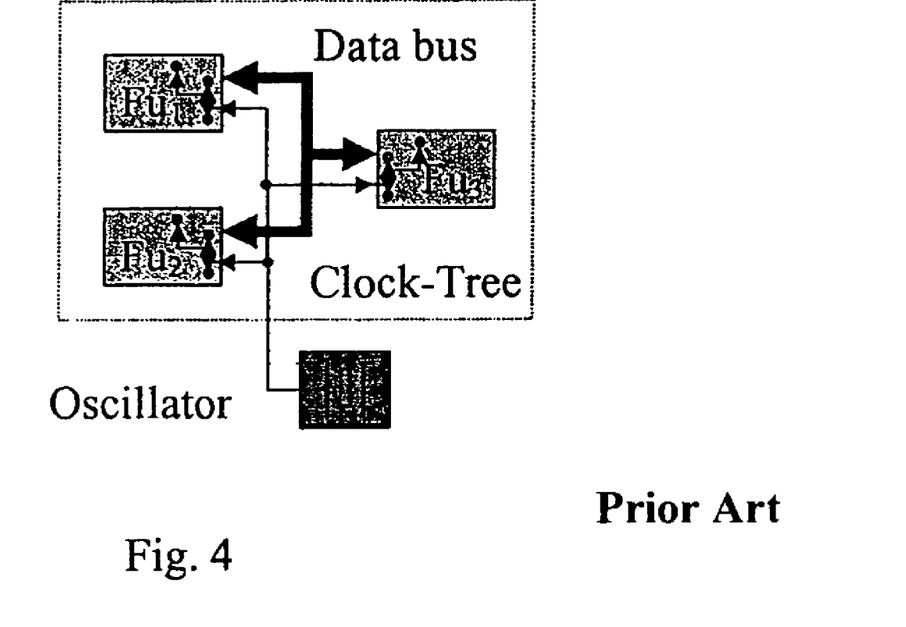
FIG. 4 illustrates a state of the art external clock pulse.
Figure 5:
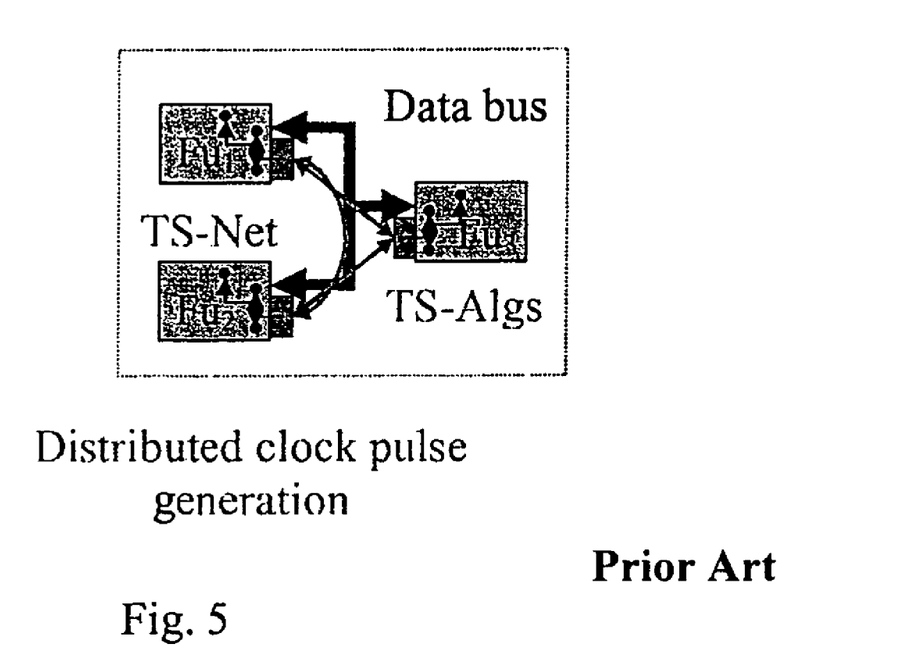
FIG. 5 illustrates a state of the art distributed clock pulse generation.

In the light of enhanced problems with the distribution of the clock pulses in classic synchronous VLSI chips a new method is proposed that manages the same without using external clock pulse sources (oscillators, quartz crystals—cf FIGS. 4 and 5) and which still retains the paradigm of synchronous design. The principle of operation consists of generating local clock pulses for "island regions" (one or more spatially adjacent functional units) with the help of a distributed algorithm implemented asynchronously. The guaranteed synchronization accuracy of these local clock pulses also permits the generation of a system-wide global clock pulse. A robust and fault-tolerant clock pulse can be generated by means of the distributivity of the algorithm, its fault-tolerance and its time independence, which can be adapted in a flexible manner to changes in the time-related parameters (other technologies or operating conditions) and which permits fast synchronous communication even between island regions that are physically widely separated from one another. The method described here varies from the GALS approach since the global communication takes place asynchronously and there are no multiple local clock pulse sources.

The propagation speed of electrical signals in circuits is limited significantly as a result of two effects: the speed of light and so-called RC time delays. In the media used typically, the speed of light is about ⅔ of the speed of light in a vacuum, which works out to $2*10^8$ m/s or 20 cm/ns. The RC delays are caused by parasitic resistances and capacitances that build up so-called RC elements. These RC elements again are nothing but low pass filters that cause a flattening of signal edges. This flattening in the amplitude range finally results in a signal delay in the time range, and the delay matches the product of the resistance and capacitance fairly well.

While the speed of light represents an irreversible physical limit for the propagation speed of signals, it is possible to optimize the RC delays. Thus, special attention is always paid to the reduction of the parasitic resistances and capacitances when developing new technologies. Nonetheless, at present, RC delays represent the actual speed limit.

If, however, one assumes optimistically that the RC delays can be overcome by means of optimizations and that the hard physical limit of the speed of light has been reached then a signal would require 0.1 ns to propagate along the edge of a microchip 2 cm in size. With the present-day common clock pulse rates of the order of 10 GHz this already corresponds to one complete clock cycle. The International Technology Roadmap for Semiconductors (ITRS)[ITRS02] predicts about 25% yearly increase in the clock pulse rates, the dimensions of the chips remaining essentially the same. In 10 years, this would mean that the signal would need more than 3 clock pulse cycles to propagate along the edge of the chip. This estimate ignores the RC delays as already mentioned, and in particular, with widely distributed networks, the spread is substantially longer than the edge of the chip. The situation is thus much more critical.

Particularly in the case of the clock pulse distribution, the physical spread of the network is reasonably large, on the one hand, and, on the other hand, the effect of run-time specific phase shifts is especially high, as a result of which the problems described have already assumed immense proportions. A number of attempts are being made [Restle01][Intel02] in order to be able to implement the synchronous model properly on a chip. Finally, it is only a matter of time until this model—at least in its current form—turns out to be an illusion that can no longer be supported. While there are adequately suitable methods to have control over a defined phase shift in the design, the main problem is represented by the unpredictable variations in the delay depending on the type variations, operational conditions, etc. Undefined logical states occur as a result of inadequate knowledge about the relative position of the signal and clock edges with respect to one another, which are the so-called meta-stability.

Even with signals other than the clock pulse, the associated execution times are becoming increasingly problematic. While it was formerly still easy to make a suitable estimate of the permissible clock frequency of a design on the basis of the gate delays in the critical path, the execution times of the interconnections are now so dominant that a similar estimate is possible after finalizing the place-&-route. As a result of this, corrective measures can only be put in place at a very late stage in the design process, which makes the design cycles substantially slower and more expensive.

Even the Reset line requires special attention. If, during the system startup, the reset is deactivated during a given clock pulse cycle k, then this is sensed by the respective functional units in the same clock pulse cycle and they react to it accordingly. However, if one of the functional units senses the reset only in the clock pulse cycle k+1 owing to signal delays, then this asynchrony can lead to unpredictable effects during system startup. In the course of fault injection experiments [Scherrer02] it has been found that processor systems can react in a very sensitive manner to an inconsistent interpretation of the reset signal.

Overall, one can thus anticipate that in the light of the constantly dominating influences of execution times, the synchronism of the execution on a VLSI chip cannot be guaranteed merely with constructive and technological measures considering the increasing clock pulse rates. Either alternatives must be found to the synchronous design paradigm or other methodical solutions such as an extrapolated concept of the definition of synchronism.

At the same time one must anticipate that the increased clock pulse rates, lower voltage tolerances and smaller structures on the chip would lead to increased rates of failure [Const02] [Salim01]. Apart from measures to enhance the fault tolerance, this would demand the increased use of fault-tolerant clock pulses. Particularly in safety-critical applications (aircraft [Truong97]) or applications having an extremely long mission time (Space travel [Gaisler02]), this is already the case and demands somewhat significant overheads in such cases. Any solution to the problem of synchronism should, therefore, also take the aspect of fault-tolerance into consideration right from the start.

PRIOR ART TECHNOLOGY AND TRENDS

Understanding the Term "Synchronization"

The term synchronization is used with different meanings in different contexts. The two most significant interpretations are discussed in the following to arrive at an explanation of the term:

Phase synchronism represents the highest level of synchronization. Two or more clock pulse signals must match one another so exactly that their phase shift is a minimum or is constant as far as possible. Accordingly, the measure of quality for the synchronization is the maximum phase deviation in degrees. Phase synchronism is necessary, if, for example, a number of logical circuits should operate in lock-step mode. The classical synchronous design assumes phase synchronism implicitly, and it is precisely this that cannot be maintained in the face of the dominance of execution times. Even if the clock pulses considered in this case have been generated from the same source, their relative phase is distorted as a result of the execution times and skew.

Time synchronism (Clock synchronism) is related to the matching of distributed clocks. The clock times to be synchronized are usually derived from local clock pulse signals that are entirely uncorrelated, and the synchronism is achieved by means of specific omission or insertion of clock impulses. The synchronization quality is assessed on the basis of the maximum deviation between two clock times, and this is also referred to as precision. When compared with phase synchronization, the granularity here is significantly less fine; the issue is not one of phase shifts within a high frequency clock pulse but rather of (integral!) deviations of local counter readings.

Basically, even time synchronization can be achieved only with synchronization measures. The selection of low-tolerance quartz crystals alone would not be adequate, since the local clock times derived from them can deviate widely from one another over a longer period of time.

Clock Pulse Distribution

The clock pulse distribution in current designs represents an ever-increasing problem on account of the specifications for the performance and power consumption. The demand for high clock frequencies and the increasing number of gates on microchips imply an increase in the power consumption of the clock tree owing to the enhanced number of switching operations and the high fan-out. The clock pulse network accounts for 25% to 50% of the power consumption of the entire chip [Dobberpuhl92]. In addition, as a result of the shortening of the clock cycles the permissible margin for the clock skew (the difference between the incidence of the clock pulse at two different components) is reduced. In modern processor designs, therefore, substantial effort must be expended in order to guarantee as skew-free a distribution of the clock pulse as possible. The clock pulse distribution is accomplished mostly with the help of balanced trees (H-trees, X-trees) in conjunction with network structures that integrate individual tree levels. Using this method attempts are made to match the lead length to each end node and the number of buffers in each such path as far as possible; thus, one speaks of zero-skew routing [Restle02].

In order to be able to "drive" the considerable fan-out of the clock pulse distribution network a large number of buffers (many hundreds to many thousands) are required that should be distributed across the chip as uniformly as possible so as to reduce the clock skew. Each buffer has a certain, though slight, degree of inaccuracy with respect to its driving power and delay characteristics as a result of the manufacturing process that leads to additional clock skew [Restle01]. Often, in modern processor designs so-called deskewing circuits are introduced. These circuits deal with programmable delays that serve to compensate execution time variations of individual buffers of the clock pulse distribution network. The driving power and the associated delay times of a buffer are largely dependent on operational parameters such as the supply voltage and the ambient temperature. Moreover, the resistance of a line can, for example, change as a result of electromigration, which can lead to changed execution time characteristics for this path. Owing to the high frequencies (GHz range), the skin effect (current flows only on the surface of the conductor) is also becoming more of a problem [Chen02]. The skin effect causes the lead resistance and thus the execution time characteristics to vary with the clock frequency.

The inaccuracies of the parameters demonstrated above make it necessary to plan large margins of safety for the clock skew, which leads to substantial reduction in the maximum permissible clock frequency of a VLSI chip. Moreover, the synchronous switching of many clock buffers generates considerable interference signals in the power supply, crosstalk and low-band electromagnetic interference radiation, which can be substantial as a result of the antenna effect of the clock tree.

Clock Synchronization

A system-wide common concept of time is introduced in the form of synchronized clocks (counters) for clock synchronization in a network of nodes. Here, one can differentiate between hardware-based and software-based approaches, hardware implementations, in general, leading to higher synchronization accuracy owing to the reduced protocol overheads and the associated low variance in the execution times [Ram90]. In general, it is true that n>3f nodes must be available in order to be able to tolerate f byzantine faulty nodes [DHS86].

Basic Principle of Clock Synchronization:

Each node has a local clock pulse generator that increments a counter, and, moreover, all nodes execute one and the same algorithm locally. The relevant time-related information for the algorithm is exchanged with the help of messages between the individual nodes. At the end of a specified interval (Resynchronization interval) a corrective function calculated from the messages is received and the local counter reading is applied to the local clock and a fresh round of the algorithm is started.

Clock synchronization algorithms can be classified in three groups based on their corrective functions:
Convergence-based
Consistency-based
Probabilistic With convergence-based algorithms a single message is sent once during the resynchronization interval to all other nodes. After an adequate number of messages of other nodes have been collected within one resynchronization interval, a convergence function (eg fault-tolerant average [LL88]) is applied to these time-related messages. Thereafter, the local clock is adjusted in accordance with the result of the convergence function.

Consistency-based algorithms are based on the consideration that all zero-error nodes have a consistent view of the entire system [Lamport85]. This means that all zero-error nodes agree on one and the same value of the clock of one transmitter, regardless of whether the transmitter has a (byzantine) error or not. If the transmitter is correct then this is also the value sent by it. In a manner similar to that of the convergence-based algorithms, even here each node sends the current value of its clock once every resynchronization interval. The time-related messages are forwarded (relayed) by the nodes, as a result of which there is an identical view of the system for all nodes. In order to determine the respective current clock time of a node (at the transmission point of time), the median is calculated from the associated values received from all other nodes. The new value of the local clock for a node is then obtained from the median of the consistent clock values of all nodes obtained previously.

Probabilistic clock synchronization algorithms proceed, in general, in two steps, the collection of data and the execution of statistical tests to determine the new value of the local clock [Lu89].

In general it is to be noted that assumptions have to be made with the algorithms presented in the literature in order to guarantee their function [Ram90]. With convergence-based algorithms it must be possible to assign the messages uniquely to the senders and this can be achieved with the help of completely networked structures or by using signatures. Moreover, there must be an upper limit for the for the message transmission time and the precision that can be achieved is also determined to a decisive extent by this limit [LL84]. The clocks must be synchronized at the starting point of time, ie their mutual deviations must be within specified limits. Convergence-based algorithms have been implemented both in the software [SIFT78], hardware [Miner92] and also in hybrid form, (combination of software/hardware) [SynUTC02]. In the case of consistency-based algorithms too it must be possible to assign the messages to the senders uniquely; in addition, many rounds of information exchange must take place so that the same global picture of the system is achieved in each zero-error node, which leads to very high overheads in terms of messages. Here, too, the upper limit for the message transmission time must be known in order to guarantee the required precision of the algorithm. Probabilistic algorithms require many rounds of information exchange before adequate data is available for carrying out the statistical tests, and then, too, the achievement of synchronization can only be guaranteed with a probability less than 1. Furthermore, probabilistic methods can only be used meaningfully in software solutions, since the hardware costs for the implementation of the statistical tests and storage of the required data would be immense.

The precision that can be achieved with clock synchronization is generally of the order of a few μs to 100 ns [KKMS95] [SynUTC02].

Fault-Tolerant Clock Pulse

By fault-tolerant clock pulse, a clock pulse signal is understood that is available across many nodes and is synchronized with pre-defined limits (precision) and can tolerate a defined number of erroneous clock pulse sources without losing this synchronism.

The predominant approach given in the literature for the generation of a fault-tolerant clock pulse [VanAlen91] [Choi90] [Vasan98] considers n nodes, each with one local clock pulse generator, where n>3f and f represents the number of byzantine errors tolerated by the system. Each node exchanges clock signals with every other node via point-to-point connections ($n^2$ leads—if its own clock pulse is also fed back to itself). The clock signals exchanged globally denote so-called macroticks that represent the system-wide synchronized clock pulse. By contrast, a high-frequency clock pulse, which is divided into microticks, is used in the individual nodes, in order to guarantee the temporal ordering of the global clock pulse signals. A reference clock pulse is obtained with the help of a selection function (Voter) in each node from all macroticks received (including its own). The local clock pulse, if required, is then aligned with the selected reference clock pulse using an analog or digital PLL (Phase Locked Loop).

A widely accepted assumption, which is also used in the implementations of [Vasan98] and [VanAlen91], is that the signal execution times between any zero-error nodes are approximately identical, so that the voters of the zero-error nodes (consistently) sense all clock pulse signals of the zero-error nodes in the same sequence. Under practical conditions this assumption cannot be maintained since, as already explained in the section on clock pulse distribution, the problems of the clock skew and the signal execution times become increasingly predominant. An approach to compensating the different execution times has been shown by [Shin88], but, however, this requires 2n phase detectors and $2n^2$ leads, which further increases the hardware costs and the susceptibility to errors.

Owing to the phase shift of individual clock pulse edges there can not only be inconsistencies with the voters, but far more, there could be meta-stability problems at the voter inputs of individual nodes, since signal changes can also occur during the setup and hold times of the respective input flip-flop. The probability of meta-stability problems can, of course, be reduced, but not completely ruled out, with the use of special input buffer circuits, which does not represent a conceptually elegant solution.

If the input signal of a PLL shows large deviations from the reference signal, then the PLL cannot regulate the signal successfully, which can lead to permanent loss of synchronization.

GALS Systems

If, as explained in the Overview section above, it is no longer possible to establish synchronism across the entire chip, then, at least it can be attempted to keep spatially demarcated areas—eg functional units in an SOC (System on a chip, one of many complex functional units of an entire system built on a chip)—in synchronism with each other. The communication between these synchronous "Islands" can then be achieved with the help of asynchronous techniques. This approach is known with the acronym GALS (Globally Asynchronous Locally Synchronous) [Chapiro84]. While the GALS technique enables the continued and unchanged use of proven synchronous design methods within a functional unit, fundamental problems occur exactly at the interfaces to the asynchronous communication units. Synchronization circuits have to be used in order to prevent the occurrence of meta-stabilities at the asynchronous/synchronous interface. These synchronizers are mostly based on pausable/strechable clocks and lead to substantial delay times at the asynchronous/synchronous interface [Chelcea00].

Another serious problem with the GALS approach is that the local clock pulses work completely unsynchronized and can, thus, drift apart from each other at random. Hence, it is not possible to establish a temporal ordering of the information exchanged without taking any additional measures. As a result, the GALS approach can be used practically, but, however, in its current form, it can neither be called conceptually elegant nor technically perfected.

Asynchronous Logic

A more consequent procedure would be the step towards a fully asynchronous implementation of the entire logic on the chip. This can not be done simply by omitting the clock pulse, but, instead, requires a far more meticulous and systematic procedure. Theoretical papers pertaining to this subject have been known for many years (cf eg [Huffinan54]). It can be argued that such an asynchronous implementation of digital logic would conceptually offer a few impressive benefits (reduced power consumption, improved modularity, etc.) [Myers01] [Hauck95] [Berke199]. The methods suggested so far for the practical implementation of the concepts are, however, in their current degree of maturity with respect to price, performance and efficiency, a practical alternative to the synchronous design paradigm only in limited border-line areas [Steininger04]. In addition to this, the synchronous design in tools, existing modules and finally even in the training of the developers has been established to such an extent that the transition to an entirely new world of asynchronous design, in any case, can only take place hesitantly, and in steps, if at all.

Virtually Asynchronous Systems

The method proposed in [Fai04] for distributed clock generation can be considered as a kind of cross between the synchronous and asynchronous worlds. Instead of feeding the clock pulse of a centralized oscillator to the individual functional units on a VLSI chip, each functional unit is assigned to a special clock pulse cell that generates their clock pulses locally. This is not achieved with the use of dedicated local oscillators, but, instead, by arranging the clock pulse cells made of MOSFETs in a two-dimensional lattice. Each clock pulse cell is connected with 4 neighboring clock pulse cells (above, below, left, right) by means of dedicated clock pulse lines. The logic of the clock pulse cells causes a status change of the clock lines when these have taken up the same status so that the lattice structure achieves the effect of a distributed ring oscillator.

It is, however, known from the theory of the distributed algorithms that an (approximately) full connection is necessary for each time synchronization method that should guarantee a constant synchronization accuracy for each pair of local clock pulse signals. The latter is again not indispensable if global synchronism should also be guaranteed. This is, however, not attainable with the method described in [Fai04] since the implementation of a complete point-to-point connection of all clock pulse cells is virtually impossible: De facto it appears that, in general, the construction of a clock pulse cell for 3D lattice structures that require 6 clock lines is difficult. The processing of the n−1 clock pulse lines required in the case of full connections cannot be implemented with this method.

Over and above this, the clock pulse generation described in [Fai04] is not fault-tolerant: A single transient fault on one of the clock lines can lead to a complete clock failure or local overclocking. This is not acceptable in the face of the increasing probability of transient faults in modern VLSI chips resulting from particle hits, supply fluctuations and stray pickups.

Finally, the implementation of a distributed clock pulse generator described in [Fai04] is based directly on the technology-dependent transistor level, while the concept presented here hinges around the technology-independent lattice level.

To summarize, the method given in [Fai04] is thus not suitable for TS-Nets (particularly fully connected TS-Algs), technology-dependent, not fault-tolerant and, in particular, also does not offer any constant and limited synchronization accuracy, without which synchronous global communication between functional units cannot be implemented.

SUMMARY OF THE PRESENT INVENTION

To begin with, we present here a short summary of what the invention relates to, namely, a method for distributed, fault-tolerant clock pulse generation in hardware systems, particularly VLSI chips, systems-on-a-chip, IP cores, PCBs and PCB systems, all of which are characterized in that the system clock pulse is generated in distribution by a plurality of intercommunicating fault-tolerant clock pulse synchronization algorithms (TS-Algs) without the use of external or internal clock oscillators, in which
i. an arbitrary number of such TS-Algs exchange information between one another via a user-defined and permanent network (TS-Net) of clock pulse signals, susceptible to transient faults,
ii. each TS-Alg is assigned to one or more functional units (Fu1, Fu2, . . . ), whose local clock pulses are generated by it, all local clock pulses are synchronized with respect to frequency in an assured manner, in the sense that any two local clock pulse signals differ from each other by a maximum of a specified, constant number of clock cycles within a given period of time, so that a global system clock pulse can be generated, which enables the global synchronous communication between any number of functional units on the chip. This global system clock pulse can be derived from, any local clock pulse with the help of suitable clock pulse conversion switching circuits (dividers, etc.), a specified number of transient and/or permanent faults may occur in the TS-Algs or in the TS-Net, without adversely affecting the clock pulse generation and/or the synchronization accuracy, the system clock pulse automatically achieves the maximum possible frequency, which is determined by the manufacturing technology used, the placement and the routing of the TS-Algs and the TS-Net, and the current operating conditions (temperature, supply voltage, etc.).

With this method, provision may be made for the availability of the global system clock pulse to depend merely on the ratio of the maximum to minimum end-to-end signal delay of the signal path on the chip, but not, however, on its maximum.

It can be advantageous if the synchronization accuracy of the local clock pulses already active and thus of the global system clock pulse derived therefrom is also guaranteed during the power-up phase of the hardware.

It is beneficial if the implementation is effected with the of asynchronous logic, such as, for example, elastic pipelines, Muller-C gates, etc.

Moreover, it is beneficial to enhance the stability of the global system clock pulse by using variable delay elements or special clock pulse conversion circuits in the TS-Algs, in which case the current delay times and/or dock pulse correction values are obtained statically at the time of manufacture and/or can be configured for the respective application of the chip at execution time, and/or are obtained automatically on the basis of a one-time or continuous measurement of the operating parameters (temperature and/or supply voltage, etc.).

The invention also includes a method for global data transmission between the various functional units of a hardware system (eg of a chip), with which a globally adequately synchronized macrotick is made available with the help of frequency division of the clock pulse generated in accordance with the procedure described above, so that data transmission that is free from meta-stability problems is possible.

The invention also includes a method for the synchronous reset of VLSI chips, characterized in that the method described for clock pulse generation guarantees the global synchronization of local pulses also during the reset phase and can thus be used for recognition of a definite starting time point for all functional units.

Moreover, the invention also relates to a hardware system for carrying such a method into effect.

DETAILED DESCRIPTION OF THE INVENTION

Based on the considerations discussed previously concerning the prior art technology, the virtually asynchronous or the GALS approach would have been very attractive if it had been possible to find a conceptually elegant solution to the problem with asynchronous communication between the synchronous islands. Thus, in addition, one should assume a structure consisting of locally synchronized functional units (modules) on one chip, these not being phase-synchronized to each other, but are frequency-synchronized to each other. Frequency synchronization in this context is concerned with matching the frequency of two or more clock pulse signals. Here, in contrast to phase synchronization, the period of time involved is larger. It is absolutely permissible that substantial phase shifts occur between the clock pulses during the interim period; however, what is decisive is that the number of phase changes in each time period under consideration may differ by not more than one a constant. (From this it also follows that when considered over an infinite (ie adequately large) interval of time, all clock signals will have the same number of clock impulses.) If one were to connect a counter to the clock pulse signals, then the maximum deviation between the counter values over an arbitrarily large interval of time would be a measure of the quality of the synchronization. In conjunction with clock synchronization this feature would also be termed as precision. Unlike clock synchronization, parity of the frequency is continuously guaranteed in the case of the proposed frequency synchronization, instead of introducing or suppressing local impulses ("rate correction") and/or making erratic corrections of the time ("state correction"). In general, the constraints in the case of clock synchronization are entirely different (large distances, nodes with varying speeds and each having a local clock pulse etc.) from those of the subject under consideration at the chip level, and thus, even the solutions and quality benchmarks cannot be used here.

In the context of the definitions given above concerning understanding synchronization, frequency synchronization thus represents a cross between phase synchronization and time synchronization. This is also clear when considering the time-related deviations. In the case of phase synchronization the shift between the clock pulse signals under consideration may under no circumstances be greater than ½ of the clock pulse cycle, and with time synchronization—owing to the entirely different assumptions mentioned above—a synchronization accuracy of 1 µs is considered to be very good (cf section 2.3)—this corresponds to 1000 clock pulse cycles at 1 GHz. In the light of the fact that phase synchronization can no longer be achieved over the entire chip, frequency synchronization with permissible deviations of a few clock pulse cycles represents a reasonable "best effort".

Unlike the GALS approach, therefore, the local clock pulses of the synchronous islands are now no longer uncorrelated, but instead, synchronous with respect to frequency. The synchronization required for this is achieved by establishing a global time reference with the help of a distributed algorithm common to all modules (cf section 4).

Each module or an adequate number of modules (=one or more physically neighboring functional units) of a VLSI chip should be increased by one very simple functional unit for this purpose, whose sole task is to execute this distributed algorithm and thus contribute to establishing the global time reference on the one hand, and, on the other, to derive the local clock pulse for the module. Since the usual algorithms are based on the replication of a function on all nodes, this functional unit can be implemented in an identical manner on all modules. The important objective is to implement the functional unit using asynchronous logic in order to eliminate problems with meta-stability at the conceptual stage itself. Purely from the practical point of view, this is also necessary since the clock pulse required for synchronous implementation of the algorithm should first be generated by the algorithm itself.

The procedures suggested in the literature (phase synchronization and also time synchronization) assume the presence of multiple clock pulse sources, and the task of the procedure essentially consists of establishing suitable synchronization between the clock pulse signals supplied by these sources. The approach proposed here takes an entirely different route that has already broken new ground in [Fai04]: There are no local clock pulse generators in this case but rather, only local instances of one single common virtual clock pulse signal that is generated by the distributed algorithm. Thus, in principle, there is no possibility of different signals diverging from one another, and phase shifts occur only from the algorithm execution or processing times. Thus the object of the method, in this case, consists in generating the clock pulse in conformity with appropriate rules.

In sharp contrast to [Fai04], whose implementation does not permit a constant synchronization accuracy, fault tolerance and a guaranteed maximum phase shift (=synchronization accuracy) can be established elegantly and with relative ease with a distributed algorithm presented in the following sections. The local clock pulse generated in this manner is distributed with the aid of a simple clock tree on the module fed by it, which is non-critical since the functional units of a given module are physically next to each other. By means of suitable mapping of the local clock pulse (microticks) on a low-frequency global clock pulse (macrotick) a consistent synchronous time basis can finally be derived for all modules [Kopetz97]. This is possible because the phase shift between any two local clock pulse signals does not exceed a specific maximum value.

The known problems of GALS architectures with the synchronous/asynchronous interface can thus be conceptually easily overcome with the proposed method. The algorithm for generating the global clock pulse is implemented in conformity with the principles of asynchronous logic. This is, of course, expensive and cumbersome, but completely avoids meta-stabilities. The local functional units can be designed synchronously, as usual, on the basis of the local clock pulse, as long as no global communication is involved. Owing to the existence of a global clock pulse, however, even the global data communication can be implemented using the customary synchronous design. Here, too, possible problems with meta-stability can be completely eliminated with suitable selection of the macroticks.

Overall, the solution strived for offers the following significant benefits:

Self generation of clock pulses with respect to the circuit, and thus savings in terms of the local clock pulse sources (oscillators, quartz crystals) with a guaranteed system-wide synchronization accuracy delimited by a constant.

The chip works with the maximum possible clock frequency at all points of time

Replacement of the complex, energy-guzzling global clock tree by uncritical point-to-point connections Optimal tradeoff with respect to maintaining the synchronous abstraction and the effective synchronism under the given physical constraints More fault-tolerant and permanent errors of the clock signals A possible implementation of this principle of operation is presented in detail in the following sections.

Basic Algorithm Used

Basic Principles

Figure 1:
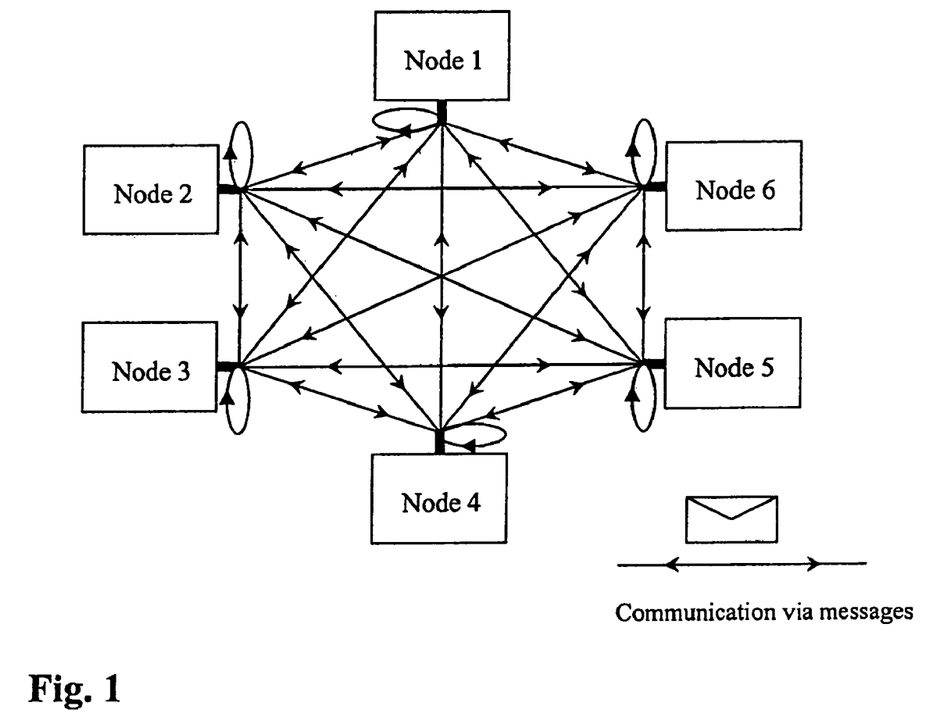
FIG. 1 shows a distribution system of computer nodes which nodes are connected by point-to-point connections.

The starting point is an existing convergence-based algorithm (cf section 2.3) at the message level [Srikanth87]. This algorithm assumes a distributed system consisting of n computer nodes, all of which can communicate with one another with the help of messages using point-to-point connections (fully networked structure, cf FIG. 1). Each node, thus, has n inputs and n outputs (one each from/to one of the n−1 other nodes plus one loop-back to itself). The communication, in the broadest sense, takes place based on rounds, and, under fault-free conditions, each node sends at least one synchronization message in each round, simultaneously to all n outputs (no assumptions are made here concerning other application-specific messages). A common time base is established on the basis of these synchronization messages with the help of a distributed agreement. This agreement functions correctly with up to f faulty nodes (ie up to f faulty or missing messages can be tolerated per node per round), if n>3f. It can thus be taken into consideration at the time of system design what number f of faults to be expected. When using the hybrid fault model presented in [WS03] and [Widder03] the fault-tolerance can, in fact, be chosen to match the requirements more exactly.

The algorithm delivers a time base in the form of a sequence of rounds numbered in increasing order, each round corresponding to one clock pulse step. The transition from one round to the next is fixed in such a manner as per the agreement that at each point of time a minimum degree of synchronization of all (fault-free) nodes in the network is guaranteed. In particular, the following can be guaranteed for the fault-free nodes. If at a given point of time one node is in round k, then, at the same point of time all other nodes are in round i, where $|i-k|<\Theta+2$. In this relationship, the quality parameter $\Theta$ is defined by the ratio of the maximum to the minimum execution times of a message in the system. The time base is (at first) not synchronized with respect to an external (absolute) reference, but only within the system (precision is guaranteed, but not accuracy).

The algorithm executes in an identical manner on all nodes, whereby the exchange of messages results in the desired interaction between the local copies, which ultimately leads to a continuous and autonomous execution of the algorithm. The dynamic behavior is determined by the local processing times for the algorithm and the respective execution times on the lines. The original algorithm is given in [Srikanth87] and here, a simplified version has been taken into consideration below, which appears to be more suitable to map onto the hardware. The execution begins at first with an initialization phase (R) and is then based primarily on two rules (1) and (2):

(R) "Reset":

```
on reset
    send (msg[1]) {once}
    local_tick := 1
```

Thus, each node sets its local counter first to the value 1 and sends a corresponding message to all in order to initiate the execution of the algorithm.

(1) "Relay":

---
when received (msg[k]) from f+1
then send (msg[k]) {once}

---

If one node receives the message "k" from at least f+1 other nodes—ie from at least one fault-free node—then it itself sends the message "k" to all nodes including itself. Since, as mentioned, the same algorithm runs at the same time on all other nodes, a so-to-speak global "consensus picture" emerges regarding the nodes that would be ready for the time period in round k+1. This rule can be used independently of the round (local_tick) in which the respective node is, as long as k>local_tick.

(2) "Increment":

---
when received (msg[k]) from 2f+1
then send (msg[k+1]) {once}
local_tick := k+1

---

If a node p receives the message "k" from at least 2f+1 nodes (incl. itself), then there is clearly a qualified majority of nodes in round k which are ready to go into the round k+1. To put it more precisely, even in the worst case (f faulty nodes), there are still at least f+1 correct nodes out of 2f+1 nodes, which have already sent the message "k". For all fault-free nodes therefore rule (1) must be fired so that a flood of "k" messages is to be expected and, as per rule (2) compulsorily all fault-free nodes would make a transition to the state k+1. Node p thus increases its local rounds counter by one clock step and sends the corresponding message "k+1". This rule, incidentally, is used only when the node concerned is itself in round k.

The receipt of the synchronization message k from the node p by the node q thus corresponds to the message to node q to the effect that node p is of the opinion that it is ready to make a transition to round k+1, ie the global clock step should be increased by one. (It is to be noted here that this does not necessarily mean that the node p is already in round k ie that it itself would make the transition to round k+1.)

It must be noted that one node must send a given message (ie "k", for example) only once. Whichever of the two rules "fires" later, there is no longer any need to send a message, ie replicas of the same messages are rejected by the receiver. Furthermore, the decisive factor is that the sender of a message can be identified without doubt (thus, the requirement of a point-to-point connection). Otherwise, a faulty node could take on the identity of another node and send messages on their behalf.

It is, moreover, also interesting to note that rule (1) will be applied to a node p prior to rule (2) only when the local_tick of at least f+1 other nodes is ahead of that of p. Node p, in this case, retains its handicap, but contributes to the formation of the opinion of the faster nodes by sending the corresponding message.

Booting

After a reset, it must be ensured that all nodes are ready to receive. Thereafter, each node sends out a message "1", as already described, to initiate the algorithm properly. Subsequently, the rules (1) and (2) begin to apply. Laggards—ie nodes that are late in completing their initialization—can immediately be pulled up to the current state with the help of the so-called catch-up rule. The details of the start-up procedure are given in [Widder03].

Characteristics

The most important characteristics of this algorithm are:
On the basis of the algorithm a global clock pulse is generated in the form of "rounds" (=microticks) in a distributed manner, which pulse ensures a pre-defined degree of synchronization on all participating (fault-free) nodes.
The algorithm is time-independent and no restrictions whatsoever are necessary with respect to the message execution times (and/or with respect to the response time to a message received).
Merely the quotient $\Theta$ of the maximum to the minimum execution time of the messages (including the processing time) determines the synchronization accuracy that can be achieved. One should note that the absolute execution times are insignificant for precision (but are significant for accuracy, if external synchronization is desired) [Widder04].
The time base established on the basis of the algorithm permits the temporal ordering of messages with a granularity of $\pi(\Theta)$ microticks.
Its function and precision can be proved formally [Widder03]
The proper start of the algorithm can be formally proved under specified conditions [Widder03]
Up to f (even byzantine) faults can be tolerated simultaneously. The fault tolerance can be simply scaled over the number of nodes.

Use for on-Chip Clock Pulse Generation

The algorithm described was originally envisaged for the synchronization of computer nodes in a distributed system. Our approach now consists in using this algorithm to provide a synchronized frequency clock pulse for one or more hardware functional units (HW-FU) eg on a VLSI chip or on a system-on-a-chip, as far as possible without having to make any assumptions about individual execution times. This involves overcoming the following significant problems:

Synchronization Accuracy

With the synchronization algorithm implemented in software a precision of the order of 1 µs is regarded as being excellent. In the hardware, the usual clock pulse rates are of the order of many 100 MHz, with which the required precision (considered on an absolute scale) must thus be better by several orders of magnitude.

Even with respect to the $\Theta$ value it is at least not common in the hardware, where the factor of interest is mostly only the phase shift between two clock pulses, and $\Theta=1$ corresponds to 360°, ie a complete clock cycle, and larger values correspond to multiple clock cycles. On the other hand, one can assume that the differences in the delay times of the messages would be substantially lower in the case of hardware implementation as against implementation in the software, since the typical problems for the software solution with queuing and degraded performance of the node would barely occur in the case of direct parallel processing in the hardware.

Solution:

The assumption of $\Theta \leq 2$ thus appears to be quite realistic both in view of the typical requirements and also with respect to the specific constraints of the hardware. Here, the selected algorithm proves itself to be extremely suitable, since only the relative deviation is taken into account.

Communication Overheads

In the case of the algorithm being implemented in the software it is assumed that a communication medium already exists between the nodes. Such a medium is required anyway for the exchange of application-related data; the algorithm is only added to this existing structure and merely causes overheads with respect to the usable bandwidth. The required point-to-point connection must not necessarily be realized physically. The decisive factor is only that a receiver can uniquely associate a message with the sender—and for this purpose a virtual point-to-point communication is adequate, eg over a bus with associated addressing, sender identification and, if required, signature. Furthermore, it must be ensured with the help of corresponding redundancy that this bus is fault-tolerant, in order to maintain the fault-tolerance of the entire system.

However, in the hardware implementation provided, the algorithm serves merely to provide a global clock pulse signal. The infrastructure for the communication must be set up particularly for this purpose and is thus to be considered invariably as a hardware overhead. The use of the buses already existing for data communication can be ruled out, since the desired clock pulse rates could be achieved only when the bus is loaded to the extent of 100% by the synchronization, thus making it unavailable for data communication.

Serial communication between the nodes can be ruled out, since no satisfactory results can be obtained therewith respect to frequency and synchronization accuracy (as opposed to the software-based solution). Parallel connections can only then be implemented economically and meaningfully when physical point-to-point connections must not actually be established—this would mean $n^2$ parallel connections for the provision of only one clock pulse. The physical implementation as bus (with virtual point-to-point connections) in turn, leads to protocol overheads (arbitration, sender-ID plus signature, etc.), which, in turn, substantially reduce the clock pulse rate and/or synchronization accuracy that can be achieved. In addition to this, a multiple redundant design would be necessary.

Solution:

The conventional solution—namely one single global clock line—is an unsurpassable reference forming a yardstick of the efficiency, which substantially hampers the acceptance of any new approach. It would thus appear to be necessary to reduce the information content of the messages to 1 bit, so that a simple 1-bit signal is adequate for the physical point-to-point connection. The discussion regarding serial versus parallel transmission is superfluous in this case.

Limited Information Content of the Messages

A significant problem with the implementation of the algorithm is now to manage with this minimum 1-bit piece of information. In particular, with this constraint it is not possible to transmit an explicit number (k) for the current round number as provided for in the algorithm.

Solution:

The k-values are transmitted incrementally (ie as impulses) and the corresponding absolute value is managed as a counter by the respective receiver. A sender ID cannot be implemented in this way, which makes it mandatory for the design to implement a physical point-to-point connection.

Under the given constraints, it is meaningful to use the technique of transition signaling [Hauck95].

Booting Without Absolute Value for k

In the original algorithm booting is achieved by the majority of the nodes being initially in agreement with one another initially and then enabling progression of the clock pulse. Laggards, as mentioned, are pulled up using the catch-up rule. This, however, requires knowledge of the absolute k-value, since the local counter of the slow node does not have the current reading.

Solution:

Solutions would thus consist of (a) modification of the booting strategy so that one can manage without the catch-up rule, (b) the "occasional" transmission of the k-value or (c) the design of the hardware in such a manner that the counter operates on each node, regardless of whether the node itself has already been initialized or not.

Multiple Triggering of a Message

Since the absolute value of k is not contained in the message, it is important to ensure that each of the rules is triggered only once for each k. Moreover, it is for various reasons desirable to ensure see that each and every message is sent only once, ie only the earlier of the two rules is triggered. This requirement is difficult to implement in the hardware owing to the parallel feature (both rules could, of course, trigger "simultaneously").

Solution:

A possible solution is to use the rising or falling edge of the clock pulse as a flag for even and odd values of k respectively, so that sending of the same k-value within a short span of time can imply be avoided (rising edge follows a rising edge), while in the case of larger spans of time identical messages can be masked out in the conventional manner.

Complexity of the Algorithm

In the software solution, there are no problems with the execution of even complex calculations in the computer nodes, since these can be done in the software. In the case of a purely hardware-based solution the required functionality must be implemented directly in the hardware (eg state machine), and even algorithmically simple calculations such as multiplication can lead to substantial overheads. In addition, the desired implementation using asynchronous logic causes further overheads. It should be remembered that n messages are received at each node, and, thus, a total of $n^2$ units must be implemented system-wide to process the messages received.

Solution:

There is no general solution available here, and optimizations must be carried out in detail, as far as possible, when effecting implementation in the hardware. For this purpose, it must be possible to convert the algorithm in such a manner that it can be mapped on to the hardware in an optimal manner.

There are a host of problems to be resolved in the hardware implementation when one goes into the details, which are primarily concerned with the fact that in the case of processes running in parallel with different (unknown) execution times, it is problematic to arrange the order of execution, whereas these processes can run in an orderly and atomic manner in the software.

Attention is drawn to the fact that all solutions described so far have the common objective of achieving as efficient a mapping on the hardware as possible. The basic underlying method of using) a distributed algorithm for frequency synchronization of nodes, and also their implementation in asynchronous hardware can also be realized in other ways. Thus none of the decisions presented here is mandatory.

Proposed HW Implementation

Architecture

Figure 2:
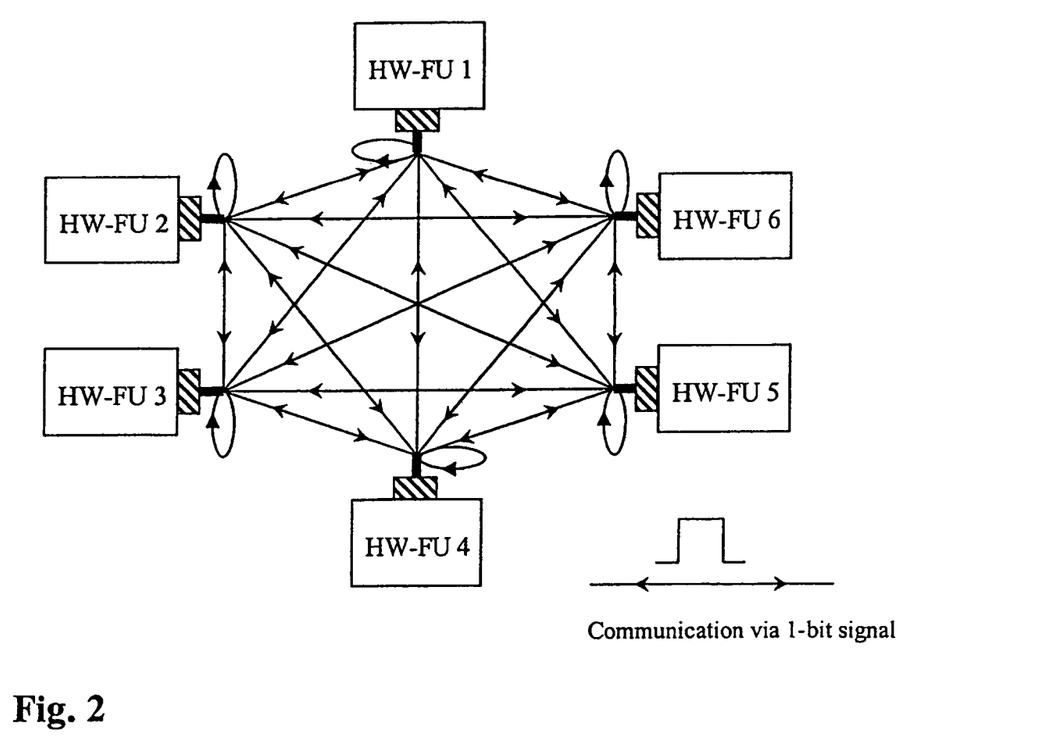
FIG. 2 shows a distribution system of hardware functional units.

The discussion presented above yields an intermeshed structure consisting of 1-bit lines as illustrated in FIG. 2. Fortunately, chip architectures that support this architecture have just come onto the market: For example, the NoC (Network on chip) design strategy supplied by Arteris [Arteris04] was originally conceived for use with GALS architectures is fitted with a switch fabric, which seems to support the required communication structures for data and clock pulses very well.

Implementation of the Function Blocks

It is implicitly assumed in the software solution that each computer node also has a local clock pulse independent of the globally synchronized time base, with which, for example, the local processor is driven. The temporal resolution of this local processor clock pulse is better by several orders of magnitude than the interval between the messages received and the precision of the global time. It is thus legitimate to assume that incoming messages are received and processed virtually continuously.

However, the objective of the hardware solution is to manage even without a local clock pulse generator, but rather, to derive the local clock pulse from the distributed global clock pulse generated. Hence, there is no a priori clock signal available to receive and process the messages. Apparently, therefore, this algorithm can only start when all units relevant for the clock pulse generation work without a clock pulse, ie have been implemented in asynchronous logic (shaded boxes in FIG. 2). Using an appropriate design one can thus also avoid meta-stability problems and race conditions, which would necessarily occur if the local logic (ie with a local clock pulse) were to be implemented using synchronous hardware.

These asynchronous boxes would therefore be in a position to generate a clock pulse collectively, which they could then provide to their respective functional units HW-FUn. In this manner, a global time base would be available, which, for example, simplifies the communication between the individual functional units or permits the synchronization of actions (access to peripherals, control of actuators, etc.).

Figure 3:
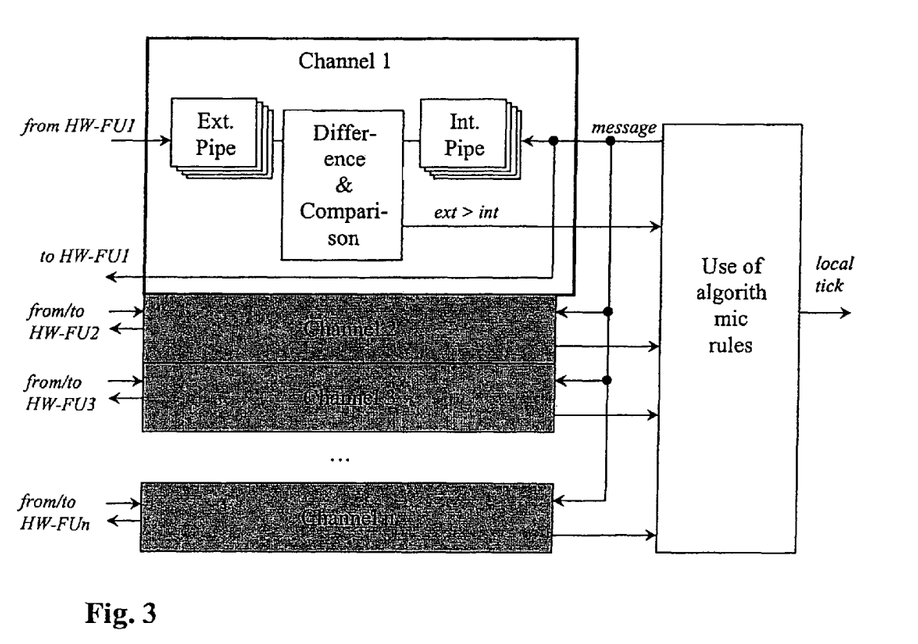
FIG. 3 illustrates the principle of operation of an implementation according to the invention.

FIG. 3 illustrates the proposed principle of operation of the implementation. The basic block diagram corresponds to one single "shaded box" in FIG. 2. The principle of implementation is as follows:

It is assumed that each node (ie in our case, each hardware functional unit, HW-FU) sends each message exactly just once. Such a message is nothing other than an edge on the line. Under this assumption one could implement the message number (that is, "k" of the original algorithm) with the help of a counter at each receiver node, with one counter $Z_{ext,i}$ being required for each input i. At the same time, an internal counter $Z_{int}$ is incremented with each message sent. Since messages are sent out simultaneously to all outputs, one common counter would basically suffice for all channels. Now, based on the comparison of the counter values it can be decided locally whether one or perhaps more messages with a higher k value have been received. This is just the case when $Z_{ext,i} > Z_{int}$. If this is the case on a sufficiently large number of channels, then one can send a new message (=flank or edge) and/or the local time base is increased by one clock impulse local_tick.

From the above description it can be seen that only a relative comparison of $Z_{ext,i}$ and $Z_{int}$ is necessary. It is thus easier to save on the hardware costs for the counters, and, instead, to provide queues, from which entries are removed in pairs, so that only the difference is visible. These queues can be implemented more conveniently (though not necessarily) using asynchronous implementation as elastic pipelines as per [Sutherland89]. This is represented schematically in FIG. 3 by "Int. Pipe" and "Ext. Pipe". The module "Difference & Comparison" ensures that entries from these pipes are consumed respectively in pairs, ie simultaneously from the internal pipe and external pipe. If there is an entry in the external pipe, whereas the internal pipe is already empty, then apparently $Z_{ext,i} > Z_{int}$, which is correspondingly evaluated by the following module "Using the rules of the algorithm". Here care must be taken to ensure that always only one of the two rules is "fired". Since reading the message also consumes it, $Z_{int}$ must be duplicated for each channel; the insertion of an entry while sending a message takes place simultaneously for all $Z_{int,i}$.

The required depth of the pipes is obtained from the maximum expected difference between the received round number and the sent round number and is limited by the algorithm to the value $\Theta$. Here, the cost for the queues can be kept within limits by using the limit motivated above to $\Theta \leq 2$.

As in the case of implementation in the software, it is favorable here to receive one's own message at one input. This contributes significantly to not making the minimum execution time over-proportionally short (for example, via an internal connection), since this would worsen the value of $\Theta$.

Fault-Tolerance

Owing to the incremental transmission of the message k by means of impulses, an error, once incurred, will always remain. This apparently reduces the robustness of the solution. Even if up to f such errors can be tolerated, the "Mission Time" of such an implementation is in practice limited, as long as no way of correcting such an error is found. This could be done, for example, at the data level, by occasionally exchanging the absolute value of k or the local_tick between the nodes. The temporal constraints for such correction messages would be completely non-critical owing to the fault-tolerance available anyway (design only for probability of multiple faults).

Frequency Stabilization

Since the distributed clock generator does not use any quartz oscillator, the constancy and stability of the clock pulse frequency is relatively low. Of course, the chip always operates with the maximum frequency depending on the respective operational conditions, which is optimal for the internal processing, but this increases the difficulty of interfacing with external synchronous components.

The frequency stability can, however, be improved, inter alia, by integrating variable delay elements in the clock lines of the TS-Net, which are programmed during chip manufacture, or dynamically at run time or, in fact, programmed continuously during operation. An example of the latter would be the temperature compensation known from TCXO's, with which the chip temperature is measured continuously and the delay is adjusted in accordance with a chip-specific temperature curve.

The use of clock pulse conversion circuits is available as an alternative option, in which a separate clock pulse signal is derived from a local clock pulse. Adder-based Clocks [SSHL97] [SSHL97] [SSHL97] [SSHL97] [SSHL97] [SSHL97] can be used here (possibly in combination with PLLs or DLLs). Adder-based clocks permit the generation of even non-integral clock ratios.

Reset

The same problems as with the clock pulse distribution make it increasingly difficult with large VLSI chips and high clock frequencies to guarantee that in the event of a (power-up) reset, all functional units begin with the same clock cycle. Since the distributed algorithm used for clock pulse generation guarantees the global synchronization even during power-up, a clean simultaneous start of operations of all functional units can be realized with ease. For this purpose it is only necessary to wait for that macrotick in which all functional units have "skipped" an open-collector Reset-Done line: Each FU that finds this line inactive at the beginning of a macrotick can begin with its operations. The guaranteed synchronization accuracy ensures that all functional units do this at the same macrotick.

Benefits of the Proposed Solution

- Circuits generating their own clock pulses, and thus, savings in the local clock pulse sources (oscillators, quartz crystals) with a guaranteed system-wide synchronization accuracy limited by a constant.
- Unlike all hardware-based methods for obtaining a fault-tolerant clock pulse, no local clock pulse generators and PLLs are required on the hardware functional units, and the clock pulse is generated as a result of the interaction between the distributed units.
- The complex, energy-consuming clock tree is omitted and also the high costs for chip-wide optimization of the clock skew.
- Unlike the GALS approach, the synchronous design paradigm is retained both locally (at the microticks level) and globally (at the macroticks level). Even problems of meta-stability can be avoided by suitable selection of the macroticks.
- No assumptions whatsoever are necessary regarding the absolute execution times. Even the relative difference $\Theta$ between the slowest and the fastest processing time only affects the precision that can be achieved.
- During the generation and distribution of the clock pulse any f faults can be tolerated. The architecture can be scaled at will with respect to f Even this is not possible with the traditional methods for fault-tolerant clock pulse generation.
- Under fault-free conditions the f slowest nodes are "pulled up" by the algorithm, ie they cannot slow down the entire system.
- As a result of using asynchronous logic (elastic pipeline, Muller-C gates) for the implementation of the algorithm, problems with meta-stability are basically avoided. With the customary solutions for the adaptation of local clock pulses meta-stability can only be made adequately improbable, but cannot be avoided.[Kopetz97]
- The clock pulse rate adapts itself automatically to the respective conditions, ie the chip always runs with the maximum frequency. Changes in the chip design or in the technology require, at the most, an adjustment of the $\Theta$ value, but otherwise no alteration of the clock pulse generation algorithms.
- Since distributed clock generation guarantees synchronization even during the power-up phase, a clean simultaneous start of operations of all function units can be implemented On the chip. In sharp contrast to existing methods, this does not demand a synchronous reset, which is increasingly difficult to implement on large chips with high clock frequencies.

REFERENCES

[Widder03] Josef Widder. Booting clock synchronization in partially synchronous systems. In *Proceedings of the 17th International Symposium on Distributed Computing (DISC'03)*, vol. 2848 of LNCS, pp. 121-135. Springer 2003.

[LeLann03] Gerard Le Lann and Ulrich Schmid. How to implement a timer-free perfect failure detector in partially synchronous systems. Technical Report 183/1-127, Department of Automation, Technische Universität Wien, April 2003

[Intel02] Ram Bhamidipati, Ahmad Zaidi, Siva Makineni, Kah K. Low, Robert Chen, Kin-Yip Liu and Jack Dalgrehn. Challenges and Methodologies for Implementing High-Performance Network Processors. *Intel Technology Journal* Vol. 06, issue 03, Aug. 15, 2002. Intel Corporation.

[Scherrer02] Christoph Scherrer and Andreas Steininger. Identifying Efficient Combinations of Error Detection Mechanisms Based on Results of Fault-Injection Experiments. *IEEE Transactions on Computers* Vol. 51, No. 2, February 2002, pp. 235-239. IEEE Computer Society Press.

[Choi90] Bong-Rak Choi, Kyu Ho Park and Myunghwan Kim. An Improved Hardware Implementation of the Fault-Tolerant Clock Synchronization Algorithm for Large Multiprocessor Systems. *IEEE Transactions on Computers* Vol. 39, No. 3, March 1990, pp. 404-407. IEEE Computer Society Press.

[VanAlen91] D. J. VanAlen and A. K. Somani. An All Digital Phase Locked Loop Fault Tolerant Clock. International Symposiun on *Circuits and Systems*, Vol. 05, June 1991, pp. 3170-3173. IEEE Computer Society Press.

[Vasan98] Nagesh Vasanthavada and Peter N. Marinos. Synchronization of Fault-Tolerant Clocks in the Presence of Malicious Failures. *IEEE Transactions on Computers* Vol. 37, No. 4, April 1988, pp. 440 448. IEEE Computer Society Press.

[Miner92] Paul S. Miner, Peter A. Padilla and Wilfredo Torres. A Provably Correct Design of a Fault-Tolerant Clock Synchronization Circuit. in *Proc. Digital Avionics Systems Conference*, IEEE/AIAA 11th, 5-8 Oct. 1992, pp. 341-346.

[Schneider87] Fred B. Schneider. Understanding Protocols for Byzantine Clock Synchronization. Technical Report 87-859, Dept. of Computer Science, Cornell University, Ithaca, N.Y., August 1987.

[Lamport85] Leslie Lamport and P. M Melliar-Smith. Synchronizing Clocks in the Presence of Faults. *Journal of the ACM*. Vol. 32, pp. 52-78, January 1985.

[Restle01] Phillip J. Restle, et. al. A Clock Distribution Network for Microprocessors. *IEEE Journal of Solid-State Circuits* Vol. 36, No. 5, May 2001, pp. 792-799. IEEE Computer Society Press.

[Srikanth87] T. K. Srikanth and S. Toueg. Optimal clock synchronization. *Journal of the ACM*. Vol. 34, no. 3, pp. 626-645, July. 1987.

[Shin88] K. G. Shin and P. Ramanathan. Transmission Delays in Hardware Clock Synchronization. *IEEE Transactions on Computers*. Vol. C-37, No. 11, pp. 1465-1467, November 1988.

[Chapiro84] Daniel M. Chapiro. Globally-Asynchronous Locally-Synchronous Systems. Ph.D. thesis, Stanford University, October 1984.

[Myers01] Chris J. Myers. Asynchronous Circuit Design. John Wiley and Sons, July 2001

[Steininger04] A. Steininger, M. Delvai and W. Huber. Synchronous and Asynchronous Design Methods—A hardware Designer's Perspective. *International Conference on Computer Design (ICCD)* 2004 (submission).

[Fai04] Fairbanks Scott (GB). *Method and apparatus for a distributed clock generator*, US patent no. US2004108876,

[Kopetz97] H. Kopetz. Real Time Systems—Design Principles for Distributed Embedded Applications. Kluwer Academic Publishers, Boston 1997.

[Const02] Cristian Constantinescu. Impact of Deep Submicon Technology on Dependability of VLSI Circuits. *Proceedings of the International Conference on Dependable Systems and Networks (DSN)* 2002. pp. 205-209, June 2002

[ITRS02] International Technology Roadmap for Semiconductors 2001 (http://public.itrs.net)

[Sutherland89] IE Sutherland. Micropipelines, *Communications of the ACM*, Vol. 32, No. 6, June 1989, pp. 720-738.

[Salim01] M. Salim Maza and M. Linares Aranda. Analysis of Clock Distribution Networks in the Presence of Crosstalk and Groundbounce. *IEEE ICECS*. September 2001, pp 773-776.

[Dobberpuhl92] D. W. Dobberpuhl et al. A 200-Mhz 64-b dual issue CMOS microprocessor. IEEE Journal on Solid-State Circuits. Vol. 27, pp. 1555-1565, November 1992.

[Restle02] J. Phillip Restle, et al. The clock distribution of the Power4 microprocessor. Solid-State Circuits Conference, 2002. ISSCC 2002 IEEE International, Vol. 1, 2002, pp. 144-145.

[Chen02] Charlie Chung-Ping Chen and Ed Cheng. Future SOC Design Challenges and Solutions. International Symposium on Quality Electronic Design. pp. 534-537, March 2002.

[Friedman01] Eby G. Friedman. Clock Distribution Networks in Synchronous Digital Integrated Circuits. Proceedings of the IEEE. Vol. 89, No. 5, pp. 665-692, May 2001.

[Ram90] P. Ramanathan, K. G. Shin and R. W. Butler. Fault-Tolerant Clock Synchronization in Distributed Systems. *Computer*, Vol. 23, No. 10, pp. 30-42, October 1990. IEEE Computer Society Press.

[Lu89] Meiliu Lu, Du Zhang and Tadao Murata. A Design Approach for Self-Diagnosis of Fault-Tolerant Clock Synchronization. *IEEE Transactions on Computers*. Vol. 38, Issue 9, September 1989, pp. 1337-1341. IEEE Computer Society Press.

[SynUTC02] Martin Horauer, Ulrich Schmid, Klaus Schossmaier, Roland Höller, Nikolaus Kerö. PSynUTC—Evaluation of a High Precision Time Synchronization Prototype System for Ethernet LANs. *Proceedings of the 34th {IEEE} Precise Time and Time Interval Systems and Application Meeting (PTTI'02)*, Reston, Va., December 2002, pp. 263-278.

[SSHL97] Klaus Schossmaier, Ulrich Schmid, Martin Horauer, Dietmar Loy. Specification and Implementation of the Universal Time Coordinated Synchronization Unit (UTCSU). *Real-Time Systems* 12(3), May 1997, pp. 295-327.

[Arteris04] Arteris, Arteris unveis strategy, technology for enabling Network-on-Chip (NoC) design, Press Release March 2004,

[Chelcea00] Tiberiu Chelcea and Steven M. Novick. A Low-Latency FIFO for Mixed-Clock Systems. *IEEE Computer Society Workshop on VLSI*, April 2000, pp. 119-126.

[Huffman54] D. A. Huffman. The Synthesis of sequential switching circuits. *Journal of the Franklin Institute*, March/April 1954.

[Hauck95] S. t Hauck. Asynchronous Design Methodologies: An Overview. *Proceedings of the IEEE*, Vol. 83, pp. 69-93, 1995.

[Berkel99] C. H. van Berkel, M. Josephs and S. Nowick. Scanning the Technology: Applications of asynchronous circuits. *Proceedings of the IEEE*, Vol. 87, pp. 223-233, 1999.

[Gaisler02] Jiri Gaisler. A Portable and Fault-Tolerant Microprocessor Based on the SPARC V8 Architecture., 2002. *Proceedings of the International Conference on Dependable Systems and Networks*. June 2002, pp. 409-415.

[Truong97] T. Kien Truong. Single Chip Fault Tolerant Clock for Integrated Modular Avionics. 16*th Digital Avionics Systems Conference (DASC)*, AIAA/IEEE, Vol. 1, October 1997, pp.: 2.1-36-44 vol. 1

[LL88] J. Lundelius-Welch and N. Lynch. A New Fault-Tolerant Algorithm for Clock Synchronization. *Proc. of 3rd ACM Symposium on Principles of Distributed Computing*, August 1984, pp. 75-88.

[SIFT78] John H. Wensley et al. SIFT: Design and Analysis of a Fault tolerant Computer for Aircraft Control. *Proc. IEEE* Vol. 66, October 1978.

[Widder04] Josef Widder. Distributed Computing in the Presence of Bounded Asynchrony. *Ph.D. thesis*, Vienna University of Technology. May 2004.

[DHS86] Danny Dolev, Joseph Y. Halpern and H. Raymond Strong. On the Possibility and Impossibility of Achieving Clock Synchronization". *Journal of Computer and System Sciences*. Vol. 32, pp. 230 250, 1986.

[LL84] Jennifer Lundelius-Welch and Nancy A. Lynch. An Upper and Lower Bound for Clock Synchronization. *Information and Control*. Vol. 62 pp. 190-204, 1984.

[WS03] Josef Widder and Ulrich Schmid. Booting Clock Synchronization in Partially Synchronous Systems with Hybrid Node and Link Failures. *Technical Report*, Nr. 183/1-126, Department of Automation, Vienna University of Technology. January 2003.

[KKMS95] Hermann Kopetz, Andreas Krüger, Dietmar Millinger and Anton Schedl. A Synchronization Strategy for a Time-Triggered Multicluster Real-Time System. Proceedings Reliable Distributed Systems (RDS'95), September 1995, Bad Neuenahr, Germany

The invention claimed is:

1. A method for distributed, fault-tolerant clock pulse generation in hardware systems, particularly VLSI chips, systems-on-a-chip, IP cores, PCBs and PCB systems, characterized in that the system clock pulse is generated in distribution by a plurality of intercommunicating fault-tolerant clock pulse synchronization algorithms (TS-Algs) without the use of external or internal clock oscillators, in which i. an arbitrary number of such TS-Algs exchange information between one another via a user-defined and permanent network (TS-Net) of clock pulse signals, susceptible to transient faults, ii. each TS-Alg is assigned to one or more functional units (Fu1, Fu2, . . . ), whose local clock pulses are generated by it, all local clock pulses are synchronized with respect to frequency in an assured manner, in the sense that any two local clock pulse signals differ from each other by a maximum of a specified, constant number of clock cycles within a given period of time, so that a global system clock pulse can be generated from any local clock pulse with the help of suitable clock pulse conversion switching circuits (dividers, etc.) which global system clock pulse enables global synchronous communication between any number of functional units on the chip, a specified number of transient and/or permanent faults may occur in the TS-Algs or in the TS-Net, without adversely affecting the clock pulse generation and/or the synchronization accuracy, the system clock pulse automatically achieves the maximum possible frequency which is determined by the manufacturing technology used, the placement and the routing of the TS-Algs and the TS-Net, and the current operating conditions (temperature, supply voltage, etc.).

2. A method as defined in claim 1, wherein the synchronization accuracy of the local clock pulses already active and thus of the global system clock pulse derived therefrom is also guaranteed during the power-up phase of the hardware.

3. A method as defined in claim 1 wherein the implementation is effected with the aid of asynchronous logic, such as, for example, elastic pipelines or Muller-C gates.

4. A method as defined in claim 1, wherein the stability of the global system clock pulse is enhanced by using variable delay elements or special clock pulse conversion circuits in the TS-Algs, wherein the current delay times or clock pulse correction values are obtained statically at the time of manufacture and/or configurably to the respective application of the chip at execution time, and/or automatically on the basis of a one-time or continuous measurement of the operating parameters (temperature and/or supply voltage).

5. A method for global data transmission between various functional units of a hardware system, such as a chip, characterized in that frequency division of the clock pulse generated in distribution in accordance with the method defined in claim 4 makes a globally adequately synchronized macrotick available to enable data transmission which is free from metastability problems.

6. A method for the synchronous reset of functional units in chips, PCBs and PCB systems which guarantees global synchronization of local pulses during the reset phase on the basis of a method as defined in claim 4 and can thus be used for recognition of a definite starting time point for all functional units.

7. A method as defined in claim 1, characterized in that the availability of the global system clock pulse depends only on the ratio of the maximum to minimum end-to-end signal delay of the signal path on the chip, but not, however, on its maximum.

8. A method as defined in claim 7, wherein the synchronization accuracy of the local clock pulses already active and thus of the global system clock pulse derived there from is also guaranteed during the power-up phase of the hardware.

9. A method as defined in claim 7, wherein the implementation is effected with the aid of asynchronous logic, such as, for example, elastic pipelines or Muller-C gates.

10. A method as defined in claim 7 wherein the stability of the global system clock pulse is enhanced by using variable delay elements or special clock pulse conversion circuits in the TS-Algs, wherein the current delay times or clock pulse correction values are obtained statically at the time of manufacture and/or configurably to the respective application of the chip at execution time, and/or automatically on the basis of a one-time or continuous measurement of the operating parameters (temperature and/or supply voltage).

* * * * *